Oct. 6, 1959
R. A. ROGERS ET AL
2,907,949
CABLE FAULT LOCATOR
Filed Oct. 21, 1955
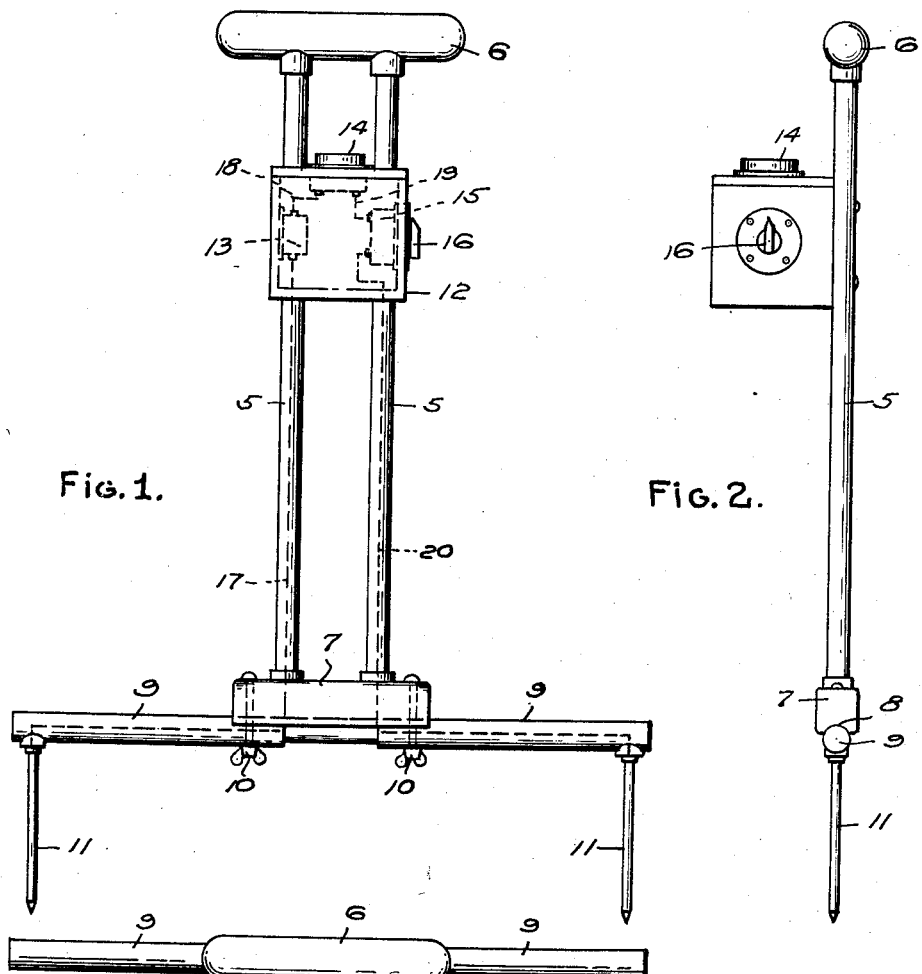
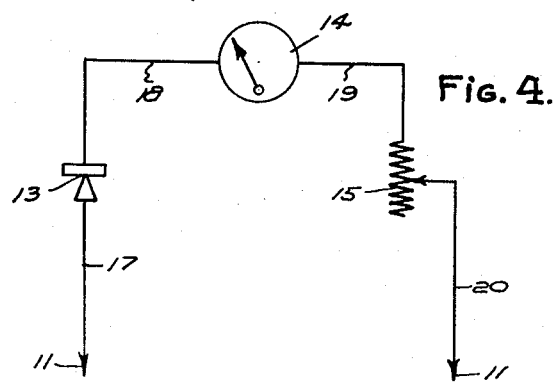
INVENTORS
ROBERT A. ROGERS
HERBERT V. JOHNSON
RUSSELL E. ROWELL,
BY
ATTORNEY.

United States Patent Office 2,907,949
Patented Oct. 6, 1959

2,907,949

CABLE FAULT LOCATOR

Robert A. Rogers, Herbert V. Johnson, and Russell E. Rowell, Fort Lauderdale, Fla.

Application October 21, 1955, Serial No. 541,952

1 Claim. (Cl. 324—52)

This invention relates to cable fault locators and particularly to a device whereby to quickly and easily locate the fault where the cable has become broken or otherwise damaged to the extent whereby a ground is produced.

Cables, and particularly underground cables employed for street lighting, where the cables are direct-burial non-metallic sheath type and where a plurality of street lights are disposed in series and energized from a common transformer, it has been particularly difficult to determine where the cable fault is located and has heretofore necessitated a considerable amount of time and excavation in order to locate the exact point of break within the cable.

The new design of fault locator to be described in this application is the answer to this problem. The principle of this locator is measuring the voltage drop across a resistance as the current through the resistance changes. In this case the resistance is the earth and the current is that in the street light circuit. When a fault or ground occurs on an underground series street light cable (direct-burial non-metallic sheath cable), the current furnished by the constant-current street light transformer will enter into the earth surrounding the cable and will seek a path through the earth to any other point on the circuit that is grounded. The street lights between these two grounds will be out or burning dim depending on the degree of fault on the cable. The fault current will be greatest at the point where it leaves the cable and enters the earth. By probing the ground above the cable with this fault locator, the exact spot where the fault exists will be indicated. The indicator in this device is a 0–50 micro-ampere direct-current microammeter. In as much as the street light circuit is alternating current, a rectifier is needed to operate the direct-current meter. A 0–100,000 ohm potentiometer operates as a sensitivity control to keep the needle of the meter on scale.

The purpose of this invention is to provide a simple mechanism having ground piercing prongs that may be progressively moved along and over the line of the suspected cable and with the device embodying certain indicating mechanism that is excited by the grounded circuit traversing the area between the two cable grounds and with the device progressively registering the magnetic influence as the device is brought closer to the cable break, thus effectively and in a minimum of time accurately determining the exact point at which the break has occurred.

The device of the present invention further contemplates an indicator that is solely influenced when brought into the field of energy and that requires no separate source of electrical energy for its operation.

Further advantages of the device will be clearly apparent during the course of the following description, reference being had to the accompanying drawings wherein has been illustrated the preferred form of the device and wherein like characters of reference are employed to denote like parts throughout the several figures.

In the drawings:

Figure 1 is a side elevation of a device constructed in accordance with the invention, Figure 2 is a side elevation thereof, Figure 3 is a top plan view of the device and, Figure 4 is a diagrammatic illustration of the instrumentalities for indicating the presence of current leakage from a cable.

Referring specifically to the drawings, the device embodies a pair of spaced-apart and parallel tubular standards 5, connected at their upper ends by a handle 6 through the medium of which the device is manipulated. The lower ends of the standards 5 are rigidly connected by a cross-head 7. The cross-head 7 upon its lower side is longitudinally grooved, as at 8 for the adjustable reception of a pair of oppositely extending and horizontally arranged tubular arms 9. The arms 9 are fixed in adjusted position with respect to the cross-head 7 by bolts 10. Fixed adjacent the outer ends of the arms 9 are depending probes 11, pointed at their lower ends whereby to facilitate their entry into the earth.

Fixed jointly upon the standards 5, adjacent the handles 6 is a box-like housing 12. Disposed within the housing 12 is a rectifier 13, see particularly Figure 4. Disposed upon the upper wall of the housing 12 and projecting therethrough for visual observation, is a microammeter. Also disposed within the housing is a potentiometer 15 having an adjusting knob 16, that is disposed outwardly of the housing whereby to facilitate the variation thereof. One side of the rectifier is connected to one probe 11 by a conductor 17, while the opposite side of the rectifier is connected to the microammeter by a conductor 18. The opposite side of the microammeter is connected to the potentiometer by a conductor 19. The variable contact for the potentiometer is connected to the opposite probe 11 by a conductor 20. The rectifier, microammeter and the potentiometer are of any desirable well known construction. The several elements, embodying the standards 5, the handle 6, the cross-head 7, the arms 9, the probes 11 and the housing 12 may be formed of any desirable material that is light in weight, such as aluminum. It should be understood of course that the probes 11 are insulated in any desirable manner from the arms 9 and the conductors 17 and 20 being suitably insulated with respect to the structure. It is of course desirable that the probes 11 be formed of sufficiently hard metal as will withstand the constant probing into the ground where they frequently come into contact with rocks and other subsurface obstacles.

During the constant checking by the service trucks of the power company, where it is observed that certain street lights are either burning very dimly or entirely extinguished, it becomes necessary to quickly determine the exact point or points in the cable that are at fault. The operator then proceeds to walk between two light standards where one light is burning while the other is either entirely out or burning very dimly, indicating to the operator that the fault in the cable lies between the two standards. He then proceeds to slowly walk between the two light standards, constantly probing the locator into the ground as he walks along and noticing the action of the microammeter to determine the presence of current leaking through the ground. As he approaches the point of fault, a reading will show on the meter, such reading progressively increasing as he approaches the point of fault. If the current is of sufficient strength that the meter goes off the scale, the operator actuates the sensitivity control 16 of the potentiometer, bringing the meter pointer back upon the scale. As the point where the operator obtains the highest reading upon the meter indicates the exact spot where the cable is at fault. Thus, with a minimum of effort the exact point of break can be quickly determined and the ground excavated at that point in order that the cable may be spliced or otherwise repaired and avoids the need of several excavations along the line of the cable to locate the point of breakage, such as has been the condition heretofore. The exact location results in a very considerable saving in labor cost, since heretofore there has been no device available whereby to locate the exact point of break without first de-energizing the cable and making direct connection of the testing device. Other devices are available but require direct connection to cable, are more complicated to operate, require more time to locate fault, and degree of accuracy is questionable. In actual practice over a considerable length of time it has been estimated that to locate, excavate and repair a cable break requires approximately 20 minutes to half an hour as compared to the present practice wherein it has been customary to employ anywhere from two hours to a half a day. The device of this invention embodies no batteries or other source of power and is entirely actuated by the field of electrical energy traversing the earth, between two points of cable breakage. Obviously with only one break in a cable, there will be no flow of current through the earth.

It will be apparent from the foregoing that a very simple and highly effective means has been provided whereby to quickly and easily locate a cable fault. The device is simple in construction, is strong, durable, cheap to manufacture and most effective for its purpose. The use of this device to locate faults on direct burial non-metallic sheath series street light cable will benefit the utilities in substantial savings in labor and material costs and faster restoration of street lighting which in turn will improve customer relations and public safety.

It is to be understood that the invention is not limited to the precise construction shown but that changes are contemplated as readily fall within the spirit of the invention as shall be determined by the scope of the subjoined claim.

Having described our invention, what we claim as new and desire to secure by Letters Patent is:

A device for locating electrical cable faults in those types of direct-burial non-metallic sheath cables and whereby to register a minimum to maximum point of fault in the cable through the medium of a field of radiation of electrical energy from the point of fault, the device embodying a frame comprising a pair of spaced apart parallel tubular standards that are fixedly connected together at their upper ends by a handle device, the standards at their lower ends being connected together by a cross head, the underside of a cross head being longitudinally arcuately grooved, tubular arms adjustably engaged within the groove of the cross head and with the arms extending outwardly in a horizontal plane, bolts for rigidly securing the arms in adjusted position with respect to the cross head, each of the arms adjacent their terminal outer ends being provided with a depending ground probe and with the probes having a sharpened lower end, a housing supported upon the standards, a direct-current microammeter disposed within the housing and having a variable reading dial extending above the housing for observation by an operator holding the handle, a rectifier disposed in the housing, electrical conductors connecting the rectifier, with one probe and with one side of the microammeter, a potentiometer disposed within the housing and with the potentiometer having a variable resistance control that extends through one side of the housing, the potentiometer being connected at one side to the microammeter through the medium of an electrical conductor and an electrical conductor connecting the variable resistance control to the other of said probes, the said probes adapted to be probed into the ground along the line of a suspected cable at fault whereby to span the area of fault and actuate the microammeter to its point of greatest reading, the said potentiometer being variable to maintain a pointer of the microammeter dial within the area of calibrations formed upon the dial.

References Cited in the file of this patent

UNITED STATES PATENTS

| | | |
|---|---|---|
| 2,091,521 | Pattison | Aug. 31, 1937 |
| 2,123,545 | Pearson | July 12, 1938 |
| 2,235,533 | Roberts | Mar. 18, 1941 |
| 2,378,440 | Scott | June 19, 1945 |
| 2,461,111 | Flinspach et al. | Feb. 8, 1949 |
| 2,688,116 | Stahl et al. | Aug. 31, 1954 |

FOREIGN PATENTS

| | | |
|---|---|---|
| 855,995 | France | Mar. 4, 1940 |